Dec. 23, 1969     E. BLAICH ETAL     3,485,678
ACCUMULATOR WITH ELECTROLYTE RESERVOIR IN THE COVER
Filed Sept. 1, 1967
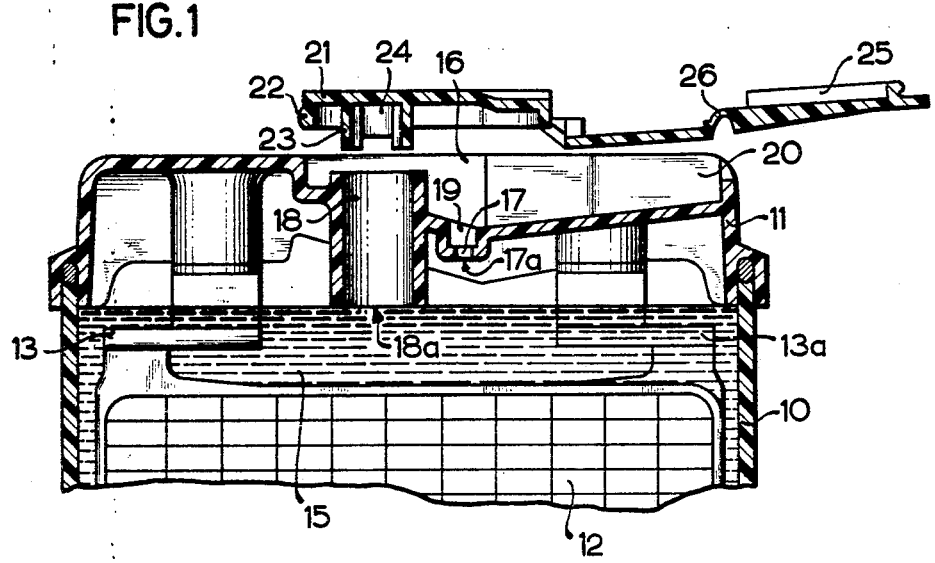
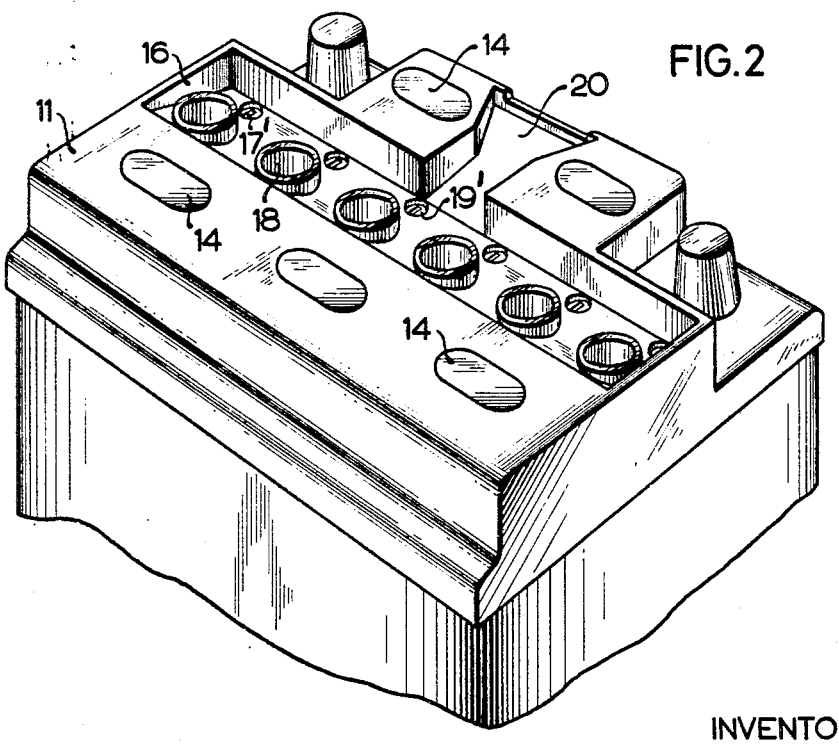
INVENTORS
Emil BLAICH
Gert NIEMANN
By
*Michael J. Striker*
their ATTORNEY

United States Patent Office 3,485,678
Patented Dec. 23, 1969

3,485,678
ACCUMULATOR WITH ELECTROLYTE
RESERVOIR IN THE COVER
Emil Blaich, Barienrode, and Gert Niemann, Hildesheim,
Germany, assignors to Robert Bosch G.m.b.H., Stuttgart, Germany
Filed Sept. 1, 1967, Ser. No. 665,032
Claims priority, application Germany, Sept. 6, 1966,
B 88,793
Int. Cl. H01m 1/02
U.S. Cl. 136—162                                     12 Claims

ABSTRACT OF THE DISCLOSURE

An electrolytic accumulator of the multi-cell type includes a housing which has an upper side and defines a plurality of upwardly open cells. A cover overlies the upper side and is provided with a reservoir, a plurality of first passages each of which has a normally closed upper end and an open lower end which is located within the housing at a first level, and a plurality of second passages each of which has an upper end communicating with a reservoir and an open lower end which is located within the housing at a second level above the first level. At least one of each of the first and second passages communicates with each of the cells.

BACKGROUND OF THE INVENTION

The present invention relates generally to electrolytic accumulators, and more particularly to multi-cell electrolytic accumulators.

It is known to construct multi-cell electrolytic accumulators wherein a housing defines a plurality of cells each of which contains a requisite quantity of an electrolyte liquid. This type of accumulator can be charged from an external power source. During charging, and in the event of excessive charging or overcharging, the electrolyte liquid develops gas, and the electrolyte liquid must periodically be supplemented by the addition of distilled water. This is quite often neglected, for instance by the operator of a vehicle in which the accumulator is being used, and the result of such neglect can be damage to the accumulator.

It has therefore been attempted to provide an arrangement wherein a reservoir of distilled water is provided in the accumulator and effects the supplementation of the electrolyte in automatic response to a condition in which supplementation becomes necessary. The concept behind this has been to make the accumulator in effect self-servicing for extended periods of time so that the necessity for checking the electrolyte level and adding further distilled water will arise only at relatively long time intervals. To produce this desired result, it is known from the prior art to provide an electrolytic accumulator in which the cover of the accumulator is provided with a reservoir which is adapted to contain a quantity of distilled water. Each of the cells of the accumulators is provided with an inlet opening for distilled water which communicates with the reservoir, and with a gas-discharge opening. The gas-discharge openings are provided with suitable valve means, such as floats, which rise to close off the individual discharge openings when the level of electrolyte in the respective cells is such that the electrolyte liquid closes off the lower ends of the liquid-inlet openings which communicate with the reservoir. Closure of the gas-discharge openings by the floats of course prevents the escape of air from the respective cells and no further distilled water can therefore enter into the cells from the reservoir and though the liquid-inlet openings. As gas pressure increases in the cells during charging or overcharging, and gas accordingly escapes, further liquid can enter into the cells through the liquid-inlet openings from the liquid reservoir.

However, this construction suffers from the disadvantage that the individual cells are galvanically shorted because the electrolyte in each cell conductively communicates with the distilled water in the reservoir. This is so because the water of course extends into the fluid-inlet passages and is in contact with the electrolyte liquid at the level to which the latter has risen to close the liquid-inlet openings of the liquid-inlet passages. This is highly undesirable because the life as well as the operating characteristics of this battery are detrimentally influenced by this. Moreover, such a battery or accumulator cannot be charged when it is completely filled because this would effect rising and overflowing of the electrolyte liquid through the liquid-inlet passages.

SUMMARY OF THE INVENTION

The present invention overcomes the disadvantages of the prior art.

More particularly, the present invention provides an electrolytic multi-cell accumulator which accommodates a reserve quantity of electrolyte liquid without establishing a galvanic shorting between the cells of the accumulator.

The present invention also provides an accumulator of the aforementioned type in which neither floats nor other movable elements are needed to control the admission of supplementary electrolyte liquid into the cells.

In accordance with one feature of our invention, we provide a multi-cell electrolytic accumulator which comprises a housing and a cover for the housing. The housing has an upper side and defines a plurality of upwardly open cells. The cover overlies the upper side and closes the same, and is provided with a reservoir, a plurality of first passages and a plurality of second passages. Each of the first passages has a normally closed upper end and an open lower end which is located in the housing at a first level. Each of the second passages has an upper end communicating with the reservoir and an open lower end which is located in the housing at a second level above the first level. At least one of each of the first and second passages communicates with each of the cells. When our accumulator, according to the present invention, is filled with an electrolyte liquid to the aforementioned first level and when reserve electrolyte liquid is contained in the reservoir, a cushion of compressed gas develops in each cell between the first and second levels as the cells are being filled to the first level. This cushion permits descent of reserve electrolyte from the reservoir into the cells only in response to development of elevated gas pressure in the respective cell, such gas pressure resulting in the escape of gas therefrom, and at a rate which compensates for such escape of gas.

It is clear that with our novel construction, the quantity of reserve electrolyte liquid is permanently maintained out of conductive contact with the electrolyte liquid which extends to the first level in the respective cells of the accumulator, except for such amounts of the reserve electrolyte liquid as will descend, i.e. drip, into the respective cells as gas escapes from the latter. This, of course, does not result in establishment of a conductive connection with the reservoir.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 illustrates in a somewhat schematic vertical section an accumulator embodying our invention; and FIG. 2 is a perspective view showing the top or cover of the embodiment illustrated in FIG. 1.

DESCRIPTION OF THE PREFERRED EMBODIMENTS

Discussing now the drawing in detail, it will be seen that in FIG. 1 the nonessential elements of the accumulator have been omitted for the sake of clarity, that is those elements which are of no consequence in a description of our invention. The accumulator illustrated in FIG. 1 is assumed to be a six-cell twelve-volt accumulator, of which a section through one cell, which is separated by separating walls from the other cells, is illustrated in FIG. 1. Reference numeral 10 identifies the accumulator housing and reference numeral 11 identifies the accumulator cover. Each of the cells, of which the one illustrated is representative, comprise therewithin the requisite number of battery plates 12 which are provided with connecting posts 13 and 13a which extend upwardly into the cover 11. In the cover 11 the connecting posts are connected with similar connecting posts by means of connectors 14.

The cells, such as the one which is illustrated in FIG. 1, are filled with an electrolyte liquid 15 whose composition need not be specifically described because it is well known in the art and does not constitute a part of the present invention. However, it is well known that such electrolyte liquid, which is decomposed when an electric current passes through it, consists primarily of distilled water. On charging or overcharging of the accumulator, the electrolyte liquid develops gas, and the electrolyte liquid must periodically be supplemented by addition of further distilled water.

The cover 11 is provided, as is evident both from FIGS. 1 and 2, with a reservoir 16 which extends across all of the cells of the accumulator. In the illustrated embodiment, the reservoir 16 is provided with a set consisting of two passages for each of the six cells of the illustrated accumulator. Each set of passages comprises a liquid-inlet passage 17 and a gas-discharge passage 18 which, as is most clearly evident from FIG. 1, is constructed as a tubular portion of the cover 11. In accordance with the invention, the outlet opening 17a of the liquid-inlet passage 17 is located within the confines of the housing—which term here is understood as denoting the space enclosed within the housing 10 and the cover 11—at a level which is higher than the level at which the outlet opening 18a of the gas-discharge passage 18 is located. Thus, when additional electrolyte liquid such as distilled water is contained in the reservoir 16 it will continue to run off through the liquid-inlet passages 17 into the respective cells as long as the air in each cell can continue to escape through the gas-discharge passage 18 associated with the cell in question. Once the level of the electrolyte liquid 15 in the respective cell has risen to a line where the electrolyte liquid 15 closes off the inlet opening 18a of the gas-discharge passage 18, no further air can escape from the cell in question. When the escape of air from the respective cells stops, however, the entry of further reserve electrolyte liquid, namely distilled water, from the reservoir 16 through the liquid-inlet passages 17 also ceases. It is evident that, because the level at which the inlet opening 18a is located is lower than the level at which the inlet opening 17a is located, the body of liquid in the reservoir 16 is effectively out of communication with the electrolyte liquid 15 in the respective cells because the liquid in the reservoir 16 cannot descend below the level of the outlet openings 17a owing to the existence of a cushion of compressed gas—and in this instance specifically of compressed air—in each of the cells.

In accordance with the present invention, the outlet openings 17a may be of various different configurations. For instance, they may be round and have a diameter not exceeding 5 mm. This is illustrated in FIG. 1. FIG. 2, which otherwise is identical with FIG. 1, illustrates that the liquid-inlet passages, which are here identified with reference numeral 17', may also be of slot-shaped configuration just as their respective outlets. In that case, the length of each slot is preferably on the order of 5 mm. and the width on the order of 1.7 mm. and definitely not in excess of 3 mm. In either case, and this is clearly evident both from FIGS. 1 and 2, the upper open ends of the liquid-inlet passages 17 or 17' may advantageously communicate with a depression 19 or 19' provided in the bottom wall of the reservoir 16. This assures that the upper open ends of the passages 17 and 17' are at all times covered by whatever reserve liquid remains in the reservoir 16 whereby assurance is provided that no air can escape through these passages from the respective cells. It is clear, of course, that two or more of the passages 17, 17' can be arranged adjacent one another and that two or more of these passages can communicate with each of the cells.

In accordance with the invention, the inner diameter of the gas-discharge passage 18 will advantageously be on the order of 14 mm. This not only permits a rapid and simple initial filling of the cells with electrolyte liquid, but also permits the introduction of a hydrometer syringe or similar instrument for determining the specific gravity of the electrolyte liquid.

Also, in accordance with the present invention, and as is most clearly evident from FIG. 2, the cover 11 is provided with an inlet channel 20 which communicates with the reservoir 16. It is advantageous that the inlet channel 20 extend from the reservoir 16 to one of the outer longitudinal edges of the cover 11. The reservoir 16 and the inlet channel 20, both of which are upwardly open, are normally closed off by a portion of the cover which in FIG. 1 is identified with reference numeral 21. It has been found that this portion may advantageously consist of a synthetic plastic material, preferably polypropylene, which is provided with downwardly-extending projections 22, 23 and 24. The projections 22 engage the cover 11, the projections 23 in the illustrated embodiment are received within the upper end of the gas-discharge passage 18 and the projections 24, which are angularly offset with reference to the projections 23 by 90 degrees, engage the upper end of the gas-discharge passage 18 from the outside thereof. This fixes the portion 21 in proper relationship with reference to the remainder of the cover 11, and maintains it in such relationship. At the same time, the upper ends of the gas-discharge passages 18 are thus normally closed off by the portion 21.

It is another concept of the invention to provide the portion 21 with a section 25 which is movable with reference to the remainder of the portion 21. This section overlies the inlet channel 20 and is connected to the remainder of the portion 21 for movement between a position in which it overlies the open side of the channel 20 and an extended second position which is illustrated in FIG. 1. The connection which makes possible such movement can, for instance, be in the form of an integral hinge 26, that is a thin strip-shaped integral portion of the plastic material of which the portion 21 consists. The section 25 defines an overflow basin. To fill the accumulator, the section 25 is first placed into the position illustrated in FIG. 1. In this context it is to be understood that the portion 21 is shown in FIG. 1 in a removed position, whereas in actual use it would normally be coupled to the cover 11, that is it would be moved closer to the cover 11 with the projections 23 and 24 engaging the upper ends of the passages 18. With the section 25 in the outwardly-extended position illustrated in FIG. 1, access is provided to the inlet channel 20. The reservoir 16 is filled with distilled water by pouring this water into the inlet channel 20. From there the water enters into the reservoir 16 and flows from there through the liquid-inlet channels 17 or 17' into the respective cells until the level of electrolyte liqud 15 in the cells has risen to the inlet openings 18a of the gas-discharge passages 18. This prevents further escape of air through these passages 18. Further distilled water is now introduced into the reservoir 16 until it overflows into the basin defined by the section 25. Thereupon, the section 25 is moved about its hinge 26 until it again overlies the inlet channel 20 with the result that the water accommodated in the basin of section 25 also flows into the reservoir 16. The inlet channel 20 is now closed.

It is clear that with the construction according to the present invention, galvanic shorting between the cells of the accumulator is reliably prevented because the liquid contained in the reservoir 16 is strictly separated from the electrolyte liquid 15 in the respective cells of the accumulator. It is also clear that with the novel invention rather long periods of time may elapse between checking of the accumulator to determine whether additional distilled water must be added to the electrolyte liquid, because for a relatively extended period of time, such addition of distilled water to replenish the electrolyte liquid takes place out of the reservoir in automatic response to the development of a need for such replenishment. Furthermore, these advantages are all obtained with a construction which is very simple and which, because it does not depend on floats or other moving parts, is essentially completely free from wear and from the possibility of malfunction based on such wear.

It will be understood that each of the elements described above, or two or more together, may also find a useful application in other types of accumulators differing from the types described above.

While the invention has been illustrated and described as embodied in an electrolytic accumulator, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A multi-cell electrolytic accumulator comprising, in combination, a housing having an upper side and defining a plurality of upwardly open cells; and a cover overlying said upper side closing the same, said cover being provided with a reservoir, a plurality of first gas-discharge passages each having an upper end and a lower end located within said housing at a first level, and a plurality of second reserve-electrolyte supply passages each having an upper end communicating with said reservoir at the bottom portion of said reservoir only and an open lower end located within said housing at a second level above said first level, each of said passages being so small as to maintain a gas seal between said cells and said reservoirs and at least one of each of said first and second passages communicating with each of said cells so that when said cells are filled with an electrolyte liquid to said first level and reserve electrolyte liquid is contained in said reservoir, a cushion of compressed gas which develops in each cell between said first and second levels in response to filling of said cells to said first level permits descent of reserve electrolyte from said reservoir into said cells only in response to development of elevated gas pressure with concomitant lowering of the electrolyte level and escape of gas from a respective cell through the associated first passage to thereby reduce the cushion pressure, and at a rate compensating for such escape.

2. An accumulator as defined in claim 1, wherein said first passages have a cross-sectional area greater than the cross-sectional area of said second passages.

3. An accumulator as defined in claim 1, wherein said lower open ends of said second passages are each provided with an elongated slot having a width not exceeding 3 mm.

4. An accumulator as defined in claim 1, wherein said lower open ends of said second passages are each provided with a circular aperture having a diameter not exceeding 5 mm.

5. An accumulator as defined in claim 1, wherein at least two of said second passages communicate with each of said cells.

6. An accumulator as defined in claim 1, wherein said cover comprises a surface defining a bottom wall of said reservoir, said surface being provided with a plurality of depressions and said upper ends of said second passages each communicating with one of said depressions.

7. An accumulator as defined in claim 1; and further comprising a channel for electrolyte liquid communicating with said reservoir for facilitating introduction of electrolyte liquid into the same.

8. An accumulator as defined in claim 7, wherein said housing has a longitudinal side and a transverse side, and wherein said channel comprises an inlet located in the region of said longitudinal side.

9. An accumulator as defined in claim 1, wherein said cover comprises a first portion provided with said first and second passages and with said reservoir, said reservoir having an upwardly open side, and a second portion removably overlying said first portion and covering said upwardly open side.

10. An accumulator as defined in claim 9, wherein said second portion is provided with a plurality of locating projections projecting toward said first portion, at least some of said projections being arranged for engaging said upper ends of said first passages for locating and maintaining said second portion in predetermined position with reference to said first portion.

11. An accumulator as defined in claim 9; further comprising an electrolyte-liquid conveying channel provided in said first portion and communicating with said reservoir; and wherein said second portion comprises a hinged lid section constructed and arranged for being hingedly displaced between a closed position in which it overlies said channel and an open position in which it is withdrawn from said channel.

12. An accumulator as defined in claim 11, wherein said lid section is constructed and arranged for defining in said open position thereof an overflow basin adapted to accommodate excess electrolyte liquid and communicating with said reservoir.

References Cited

UNITED STATES PATENTS

| Re. 22,833 | 12/1947 | Sandusky | 136—177.6 |
|---|---|---|---|
| 1,327,121 | 1/1920 | Sturges | 136—162.4 |
| 1,878,223 | 9/1932 | Woodbridge | 136—162.45 |

FOREIGN PATENTS 350,285  6/1931  Great Britain.

ALLEN B. CURTIS, Primary Examiner

D. L. WALTON, Assistant Examiner

U.S. Cl. X.R.

136—170